UNITED STATES PATENT OFFICE.

MARTIN L. GRIFFIN, OF HOLYOKE, MASSACHUSETTS.

MANUFACTURE OF PORTLAND CEMENT.

SPECIFICATION forming part of Letters Patent No. 497,785, dated May 23, 1893.

Application filed April 5, 1892. Serial No. 427,898. (No specimens.)

*To all whom it may concern:*

Be it known that I, MARTIN L. GRIFFIN, of Holyoke, in the county of Hampden and State of Massachusetts, have invented a new and useful Improvement in the Manufacture of Portland Cement, of which the following is a specification.

In the treatment of carbonated soda liquors with lime, in the process of making caustic soda, and particularly in the production of caustic soda liquor for making chemical fiber by what is known as the "soda process," vast quantities of a material known as "lime sludge" are produced, which material has heretofore been thrown away as waste. In said "soda process" for making chemical fiber, for example, the alkali is recovered after each operation of digesting the wood by evaporation and incineration of the alkaline, concentrated liquid. The black-ash resulting therefrom is lixiviated, and the solution is treated with lime, thereby producing the caustic soda liquor required for the wood and a precipitate of carbonate of lime, which latter is the "lime sludge" above referred to and which has heretofore been considered as having no commercial value and has been treated as waste material.

My invention is based upon the fact that I have found this hitherto waste material, when mixed in proper proportions with clay or other aluminous materials ordinarily used in the manufacture of cement, forms an excellent quality of Portland cement. I have found this lime sludge to be composed, usually, of carbonate of lime, having mixed therewith a considerable percentage of fine charcoal dust, a small percentage of free lime, a small percentage of impurities from the lime, such as silica, alumina, and oxide of iron, and a varying percentage of alkali. Neither of these ingredients is detrimental to the use of the material for cement purposes, except the alkali, and that only when found in excessive quantities. In the practice of my invention, therefore, it is necessary simply to submit the lime sludge to a thorough washing to eliminate therefrom any excess of alkali, when the material is ready to be mixed, in the proper proportions, with clay or other aluminous material, which proportions will be readily understood by persons engaged in the manufacture of cements, and to be then dried, calcined, and pulverized in the usual manner. I have found that a superior quality of Portland cement can be made in this manner, and at a very low cost inasmuch as the lime sludge exists, as before stated, in vast quantities as a waste material, and for the further reason that it does not require an expensive preliminary treatment to render it ready for use. In this respect my invention differs materially from those in which attempts have heretofore been made to utilize waste materials for a similar purpose. In Letters Patent No. 394,663, dated December 18, 1888, for example, it is proposed to utilize a waste material therein called "lime mud" but known to the trade as "alkali-maker's waste," for the manufacture of cement, but the expensive preliminary processes which are required to eliminate from said material the deleterious sulphides, chlorides and other salts therein contained, nullify to a great extent the original cheapness of the material, so that its use for cement purposes presents but little advantage over the materials already used. The lime sludge utilized by me, on the contrary, requires no preliminary purification other than the washing operation, above mentioned, to eliminate the excess of alkali should such an excess be present. The presence of the fine charcoal dust in the lime sludge is advantageous rather than otherwise, owing to the fact that, said dust being consumed in the later operation of calcining the compound or "slurry," it leaves the latter very porous and capable of being ground to a fine powder very readily and quickly.

In addition to the saving in cost effected by the use of the material herein described in the manufacture of cement, the quality of the cement itself is materially improved, and for the following reasons:—It is an understood fact that the more finely carbonate of calcium (carbonate of lime) is ground or otherwise powdered, the more intimate the mixture with the aluminous materials and the more complete the chemical action during the period of burning the dried mixture for cement. Hence the finer quality of cement after the grinding of the "clinker," and the less waste from improperly mixed and burned material. By the usual processes in which carbonate of calcium is used, it is obtained from limestone of a more or less pure quality, and this limestone or marl must be subjected to a crushing and grinding process before it can be mixed with other aluminous materials in the proper proportions, the degree of fineness to which it is finally reduced depending upon the perfection of the machinery employed and the amount of time which the manufacturer is willing to allow for this part of the cement making process.

The precipitated carbonate of lime used by, produced, as before described, by the addition of lime to the soluble sodium carbonate, is when dried an impalpable powder, requiring no grinding and no triturating process, and such material is, therefore, in the best possible condition for intimate mixture with the aluminous materials with which it is united to produce the cement and the cement thus produced is of a materially improved quality by reason of such intimate mixture.

Having thus fully described my invention, what I claim, and desire to secure by Letters Patent, is—

The improvement in the art of making Portland cement which consists in producing precipitated carbonate of lime by the addition of lime to a soluble carbonate, such for example as sodium carbonate, and then mixing said precipitate with clay or other aluminous material in the proper proportions and drying, calcining and grinding the compound thus obtained, substantially as set forth.

MARTIN L. GRIFFIN.

Witnesses:
W. H. CHAPMAN,
J. E. CHAPMAN.